United States Patent Office.

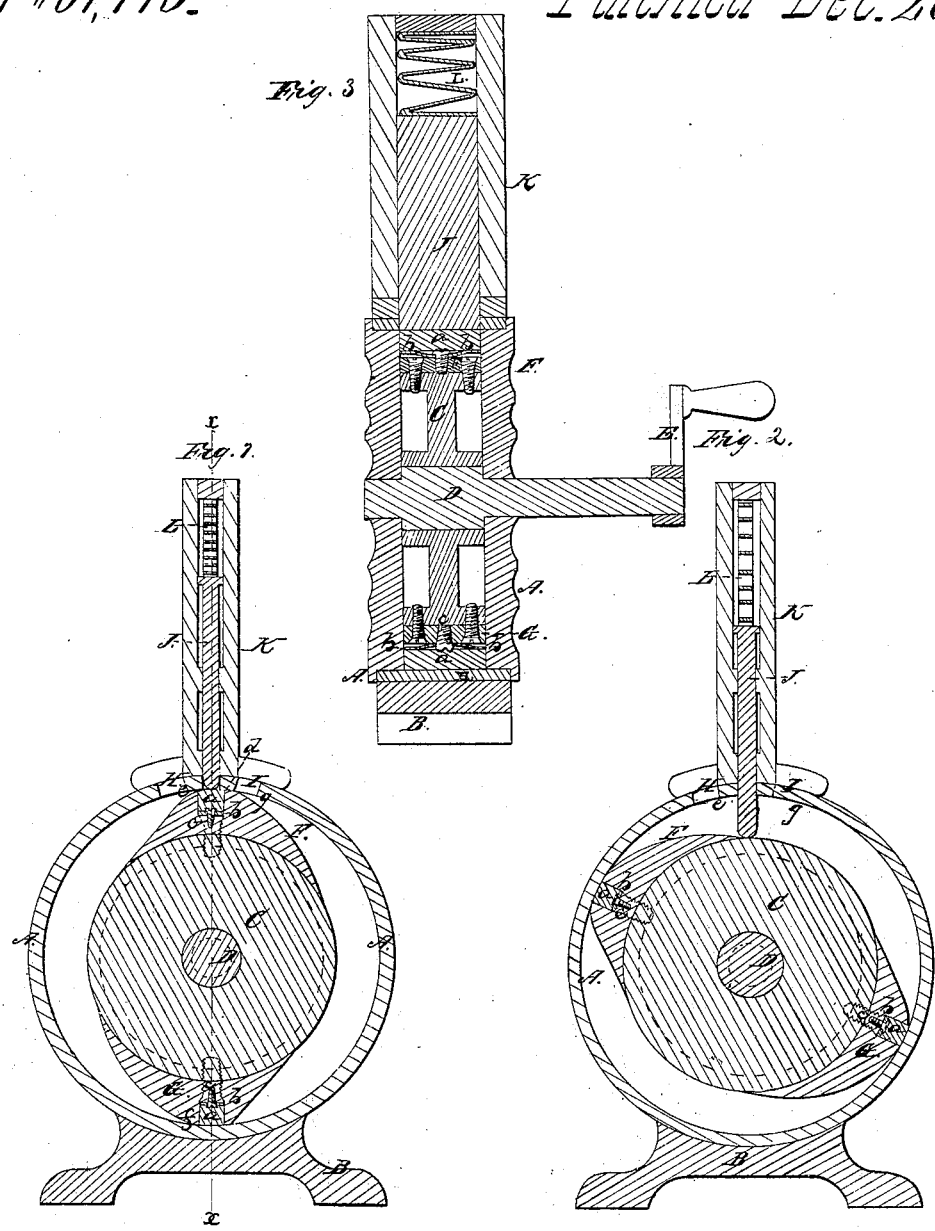

REUBEN C. GROVER AND JAMES NICKELSON, OF NEWTON, MASSACHUSETTS.

IMPROVEMENT IN ROTARY PUMPS.

Specification forming part of Letters Patent No. 51,713, dated December 26, 1865.

*To all whom it may concern:*

Be it known that we, REUBEN C. GROVER and JAMES NICKELSON, both of Newton, in the county of Middlesex and State of Massachusetts, have invented certain new and useful Improvements in Rotary Pumps, of which the following is a full, clear, and exact description, reference being had to the accompanying drawings, making part of this specification, in which—

Figure 1 is a central vertical section through our improved pump, the cylinder being revolved into a position to cause one of its abutments to raise or open the gate. Fig. 2 is a central vertical section through the same, the abutment being represented as having passed from under the gate so as to allow of its being closed. Fig. 3 is a section through the same on the line $x\ x$ of Fig. 1.

Our invention consists in a cylinder provided with two or more abutments revolving within a shell or casing, said abutments passing under and raising the gate, thereby causing a vacuum to be formed between each abutment and the gate behind it, into which the water flows, while the water in front of each abutment is carried around and forced by it to the outlet.

To enable others skilled in the art to understand and use our invention, we will proceed to describe the manner in which we have carried it out.

In the said drawings, A is the shell or outer casing, resting upon any suitable base, B. Within the center of the casing A is placed a cylinder, C, which is revolved with the shaft D by power applied to the crank E. From the outer periphery of the cylinder C project the abutments F G, in each of which is formed a recess for the reception of a block, $a$, of metal or other suitable material, which forms a water-tight packing on being pressed outward against the inner periphery of the casing A by a flat spring, $b$, secured to the abutment by means of a screw, $c$.

H is the inlet, and I the outlet, which are placed as closely together as possible, and allow room for the gate J to be moved between them. This gate J is inclosed by and slides freely within a box or frame-work, K, the lower end of the gate fitting so snugly as to exclude the entrance of water to the inside of the box K.

L is a spring, the lower extremity of which rests upon the top of the gate J, while its upper extremity bears on the under side of the top of the box K, thus continually exerting a downward pressure upon the gate and keeping it constantly in contact with the periphery of the cylinder C or its abutments F G.

Operation: The pump being submerged, or a suction-hose attached to the inlet H, and the parts being in the position represented in Fig. 1, power is applied to the crank E to revolve the cylinder C. As soon as the point $d$ of the abutment F passes beyond the lower extremity of the gate J a vacuum commences to be formed, and on passing the point $e$ of the inlet H the water flows in behind it, and the gate gradually descends along the curved surface of the abutment F until it rests upon the periphery of the cylinder C, as seen in Fig. 2. After the point $f$ of the abutment G passes the lower extremity of the gate J the water in front is carried around in the waterway between the cylinder and casing and commences to be discharged, when the point $d$ of the abutment F passes the point $g$ of the outlet I, which operation of causing the water to flow into a vacuum behind the abutment and forcing the water in front of it out of the discharge-pipe continues, as before, in an easy and uninterrupted manner.

In some cases the outer casing may be provided with a stationary abutment in which are made inlet and outlet passages, the gates being attached to the revolving cylinder and being pressed outward against the surface of the casing and its abutment by springs placed behind them, by which construction we are enabled to use it either as a pump or a rotary engine.

When steam is used a cam may be placed on the shaft for the purpose of excluding the steam from the passage between the cylinder and casing until the gate passes off the inclined surface of the stationary abutment and comes in contact with the inner surface of the casing. The steam in front of one gate is expelled immediately previous to its being admitted behind the other gate.

What we claim as our invention, and desire to secure by Letters Patent, is—

The revolving cylinder C, provided with two or more cams or abutments, F G, in combination with the outer casing, A, and gate J, operating substantially as described.

R. C. GROVER.
JAMES NICKELSON.

Witnesses:
P. E. TESCHEMACHER,
N. W. STEARNS.